United States Patent [19]
Bass

[11] Patent Number: 5,165,500
[45] Date of Patent: Nov. 24, 1992

[54] HUNTER'S STAND BAG

[76] Inventor: Irma L. Bass, 510 Sycamore St., Wilson, N.C. 27893

[21] Appl. No.: 767,885

[22] Filed: Sep. 30, 1991

[51] Int. Cl.⁵ .............................................. A01M 31/02
[52] U.S. Cl. ..................................... 182/187; 182/129
[58] Field of Search ................... 182/187, 188, 129; 190/119; 150/119

[56] References Cited
U.S. PATENT DOCUMENTS

| | | | |
|---|---|---|---|
| 2,499,332 | 2/1950 | Schiff | 150/119 |
| 2,612,199 | 9/1952 | Schocket | 150/119 |
| 4,274,508 | 6/1981 | Hughes | 182/129 |
| 4,417,645 | 11/1983 | Untz | 182/187 |
| 4,452,338 | 6/1984 | Untz | 182/187 |

OTHER PUBLICATIONS

The "Trophy Hunter" treestand, Trophy Hunter Products Inc. Rt. 1 Box 680 Townville S.C. 29689 (no date).

Primary Examiner—Alvin C. Chin-Shue
Attorney, Agent, or Firm—Olive & Olive

[57] ABSTRACT

A hunter's bag for containing items of use to a hunter which may be removably attached to a hunter's tree stand. The bag is constructed of camouflage, water-resistant fabric, attaches to the stand by means of hook and loop type fasteners and used a series of noiseless, non-reflective clasps for closure. It is adapted to being carried with the hunter's tree stand or carried separately.

7 Claims, 3 Drawing Sheets

HUNTER'S STAND BAG

FIELD OF THE INVENTION

This invention relates to the field of hunting equipment, and more particularly to storage and carrying containers for hunters' supplies.

BACKGROUND OF THE INVENTION

In the sport of hunting, a commonly used strategy is for the hunter to secure a position from which the prey may be observed while the hunter remains unnoticed. Many types of shelter, blind or camouflage are used for this purpose.

A particularly useful device employed is a hunter's tree stand which permits the hunter not only to be unobserved, but also to be relatively comfortable for long periods of time. Such a device is described in U.S. Pat. Nos. 4,417,645 and 4,452,338, both to Reese E. Untz. The stands described in these patents relate to hunter's devices for sitting in a tree while waiting for the designated prey to appear.

The function of camouflage in hunting is well established. Even though the tree stands discussed above are placed above the line of sight of most animals, the hunter will ordinarily take special precautions to conceal himself. The commercially available stands are sold in a nonreflective black painted finish. Regardless of the stand's color and finish, the hunter will typically paint spots of green and brown to more completely blend the stand to the background woods.

A typical model hunter's stand is sold by the BuckShot Company of Wilmington, N.C. under the name of PortaClimb. In addition to a non-reflective finish, this stand is equipped with a cushioned cover for each arm to protect against the arm being accidentally hit by a hard object and making a noise. Such a noise could reveal the location of the hunter.

While the hunter may be reasonably comfortable when seated in the stand, he requires means to store such things as food, drink, field glasses or a raincoat in addition to storage provided by his pockets or a backpack. He often remains in a particular location for many hours. Both pockets and a backpack have serious limitations. Pockets are normally limited in size and capacity, and a backpack is awkward to access while in a seated position.

There is presently a bag on the market which is useful to a hunter for storing and accessing supplies. It is sold by Trophy Hunter Products, Inc. of Townville, S.C. 29689. The Trophy Hunter bag does not satisfy all the objectives below because it is closed by means of a zipper, it does not have an opening covering closure flap, and it utilizes fabric straps with buckles to hang from an arm of the hunter's stand. The effect of these drawbacks and the relative improvement provided by the present invention will be described below.

Therefore, an object of the present invention is to provide an equipment container for a hunter which may be attached to a hunting stand.

An additional object of the present invention is to provide a container which will be easy to access while the hunter is in a tree stand.

A further object of the present invention is to provide a container which may be utilized without causing noticeable noise.

Another object of the present invention is to provide a container which will not be visually noticeable in use.

These and other objects of the invention will be apparent through the disclosure and claims which follow.

SUMMARY OF THE INVENTION

The invention disclosed provides a bag for hunters which may be removably attached to the arms of a hunter's stand of a type commonly used in hunting. The bag of the invention furnishes a convenient and spacious place to store items needed by the hunter during his wait for prey. The bag is made of camouflage pattern fabric, is water resistant, and has noiseless nonreflective clasps.

DESCRIPTION OF THE INVENTION

The invention described herein provides a hunter's stand bag which satisfies the objects outlined in a practical manner. It is lightweight, water resistant, camouflaged, spacious, easily transported and relatively quiet in operation.

Figure 1:
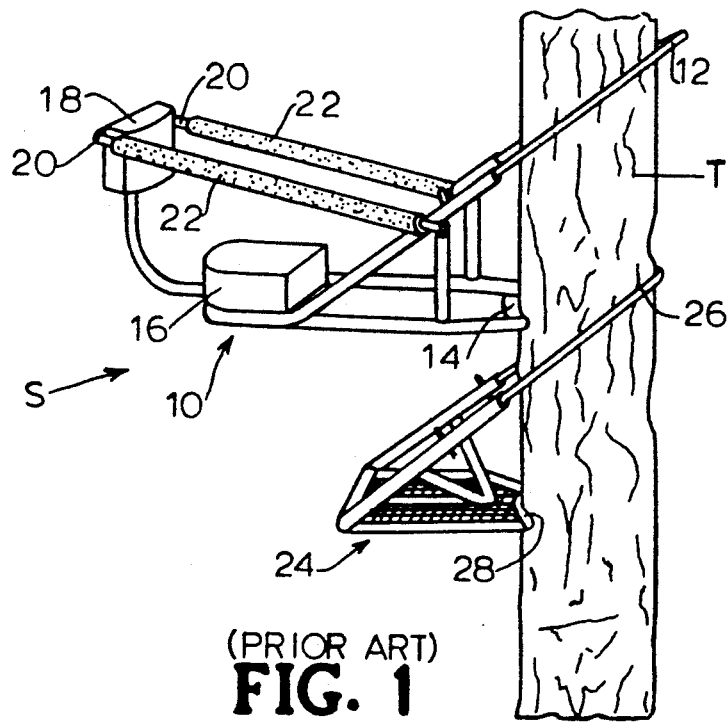
FIG. 1 is a perspective view of the hunter's stand of the prior art illustrated in use on a tree.

FIG. 1 illustrates the prior art commonly used hunter's stand mounted on tree T as it would be normally used. The hunter's stand S is comprised of two major parts, seat frame 10 and foot supporting frame 24. Seat frame 10 is held in posit on by the weight of either seat frame 10 alone or of a hunter seated in place which presses blade 14 into tree T and causes the frame 10 to pull against seat bracing frame member 12. The hunter will be seated in position upon seat 16 with his back against seat back 18. Seat back 18 is supported by arms 20 which may be fitted with arm cushions 22, made of soft, flexible material for comfort and noise avoidance and whose resilience and shape tends to hold them in place.

Foot supporting frame 24 operates in similar manner to seat 10 by pressing foot blade 28 into the side of tree T as the applied weight pulls on foot bracing frame member 26. The manner of assembling and of raising the hunter's seat device in a tree T is outlined in the patents identified above to which reference is directed.

Figure 2:
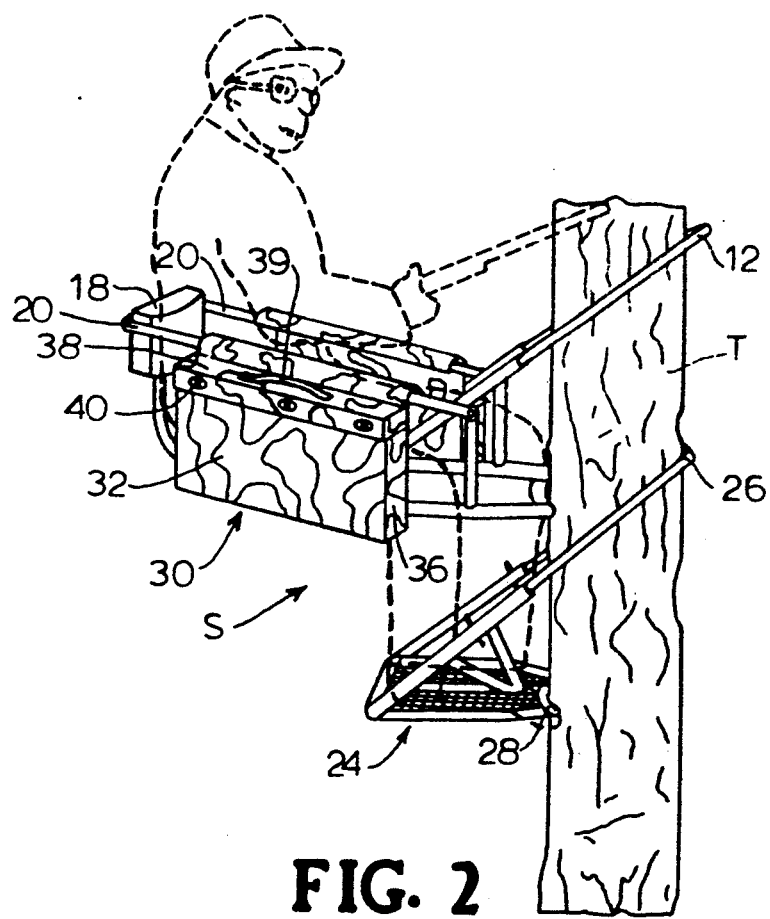
FIG. 2 is the perspective view of FIG. 1 with the addition of a hunter's bag of the present invention mounted on each arm of the stand and showing in dashed lines, a hunter seated thereupon.

In FIG. 2 the same view of seat 10 and foot supporting frame 24 is shown, modified by the addition of hunter's bag 30 of the present invention. Bag 30 may be hung from either arm 20 or one bag hung from each of arms 20 of hunter's stand seat frame 10 by means to be described in detail below. Each arm cushion 22 will fit over the portion of bag 30 which is wrapped around a corresponding arm 20 so as to allow the hunter the same comfort as usual. The coverage afforded by camouflage pattern bag 30 aids in hiding a portion of the body of the hunter when seated as can best be seen from FIG. 2. The bags 30 also provide the hunter a considerable amount of storage space for food and equipment which may be needed during the time spent waiting for prey.

Figure 3:
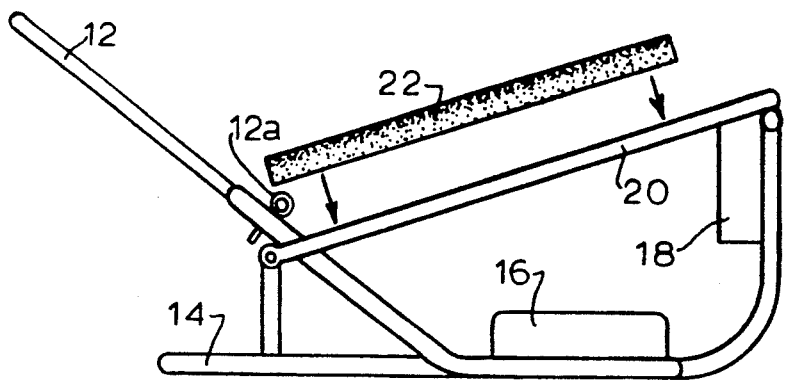
FIG. 3 is an elevation view of the hunter's stand seat of the prior art with an arm cushion positioned to be placed over an arm.

Seat frame 10 of the prior art hunter's stand is shown in the elevation view of FIG. 3. Seat bracing frame member 12 has locking pin 12a which is removed in order to separate and place member 12 around a tree. Locking pin 12a is then reinserted to lock member 12 at a desired length, thereby determining the level of seat 16 and seat back 18 in use. Seat blade 14 contacts the tree trunk and helps support the stand (FIGS. 1, 2). Each arm cushion 22 is resilient and is shaped so that it can be resiliently secured over a respective arm 20 to soften the surface on which the arm of the hunter will rest.

Figure 4:
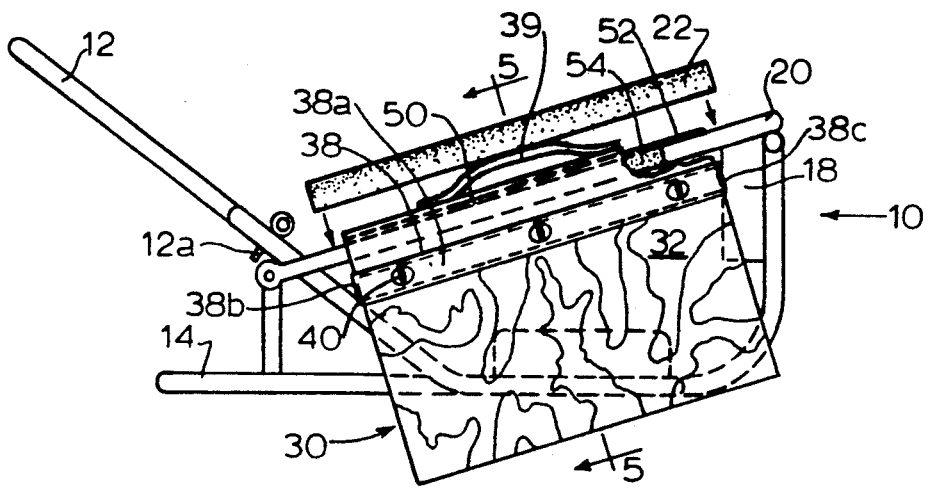
FIG. 4 is the elevation view of FIG. 3 with the addition of a hunter's bag of the present invention mounted thereupon and an arm cushion positioned to be placed over the bag support flap.
Figure 7:
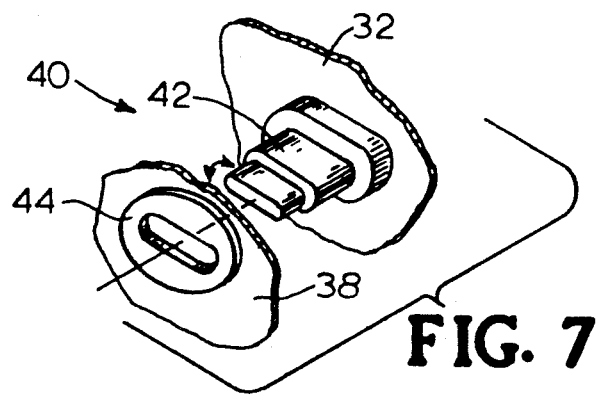
FIG. 7 is a perspective exploded view of a relatively quiet operating twist clasp with a twist clasp tongue positioned to be inserted into a twist clasp slot and then twisted closed.

FIG. 4 illustrates the present invention in greater detail as it is mounted for use on an arm 20 of seat frame 10. Bag 30 is attached by means of support flap 50 to the selected arm 20 before placing an arm cushion 22 thereupon. Bag 30 is made of a camouflage pattern fabric which is water resistant and lightweight to optimize the benefits intended. Front panel 32 is made in a size to fit the length of arm 20, to best cover the hunter and to optimize use of available space. Closure 38 (FIGS. 4, 5, 8) fits completely over the upper opening of bag 30 and is constructed with downwardly extending flaps 38a, 38b, 38c connected to the front and side edges respectively and configured to overlap and adequately close bag 30 and aid in keeping rain out. Twist clasps 40 (shown in detail in FIG. 7) are adapted to hold closure 38 in place and allow the hunter to open and close bag 30 with the least amount of noise possible.

In the preferred embodiment, bag 30 has an approximate height of 12 inches (30.5 cm.), a length of 20 inches (50.8 cm.) and a width of 3 inches (7.62 cm.). In this same embodiment, bag 30 is made of camouflage decorated 400 denier nylon woven fabric and is sewn together with a water resistant polyester sewing thread. In areas of particular stress, such as support flap 50 and the edges of closure 38 and front panel 32 where twist clasps 40 are installed, a reinforcing layer of compatible fabric may be added for strength.

Figure 8:
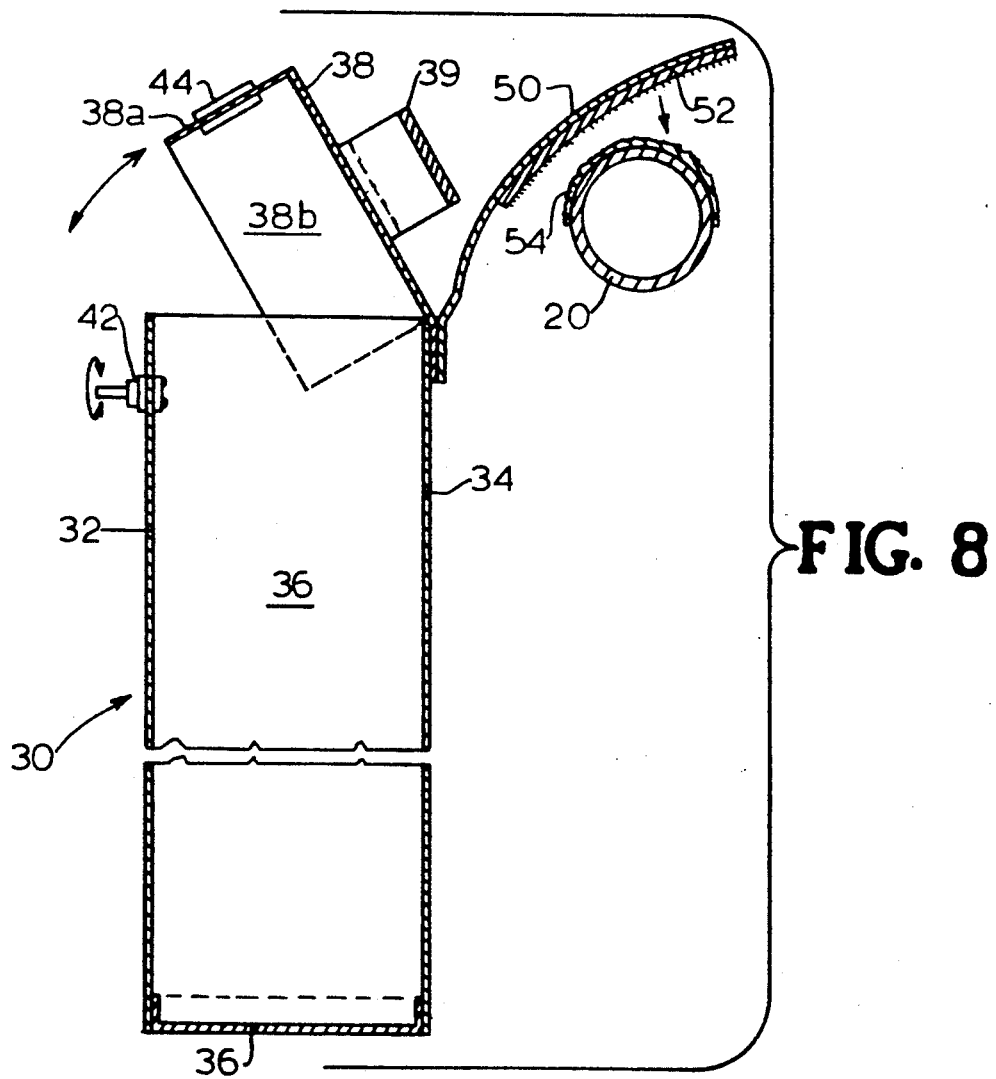
FIG. 8 is a sectional elevation view of the hunter's bag in position to be mounted to an arm of the hunter's stand.

Referring to FIG. 8, the preferred embodiment is made by sewing two substantially equal panels, front panel 32 and rear panel 34 to a U-shaped edge panel 36. Edge panel 36 extends around the two vertical edges and the lower horizontal edge of panels 32, 34, and is firmly stitched thereto. The upper horizontal edges of panels 32, 34, 36 surround the access opening of bag 30 which is covered by closure 38. Closure 38 is sewn to the upper horizontal edge of rear panel 34 and is positioned so as to be capable of flexing forwardly to cover the opening between front panel 32 and rear panel 34. Downwardly facing front flap 38a, end flap 38b and end flap 38c, not shown, overlap the top edges of bag 30 when closed. Support flap 50 is stitched into the same seam as is the attachment of closure 38 to rear panel 34. A hook and loop type fastening material 52 is sewn to the side of support flap 50 to wrap around the arm 20 on which bag 30 is supported with the gripping face exposed. The hook and loop type fastener used in the preferred embodiment is similar to the materials sold under the trademark Velcro ® and is manufactured and sold under the trademark Aplix ® by Aplix, Inc. of Charlotte, N.C. A piece of mating hook and loop material 54 which has an adhesive backing is adhered with its gripping face exposed to the respective arm 20 in a central location.

Figure 5:
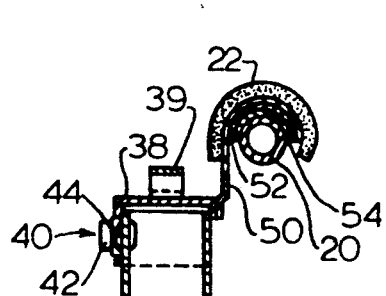
FIG. 5 is a sectional elevation view taken in the direction of line 5—5 of FIG. 4 with the closure of the hunter's bag closed and with an arm cushion placed over the bag support flap.
Figure 6:
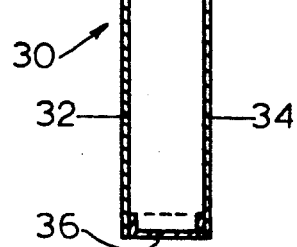
FIG. 6 is the sectional elevation view of FIG. 5 with the closure of the hunter's bag open and with an arm cushion positioned over the bag support flap so as to retain the closure in an open position.

To install hunter's bag 30, the two lengths of hook and loop material 52 and 54 are pressed into contact which enables the bag 30 to be supported by support flap 50. FIG. 5 illustrates bag 30 mounted by hook and loop type fasteners, parts 52, 54, to arm 20 with closure 38 closed. If it is desired to keep closure 38 in the open position for an extended period of time, closure 38 may be wrapped around arm 20 and arm cushion 22 then placed over the layered fastening material 52, 54, support flap 50 and closure 38 (FIG. 6) to hold closure 38 open. An adequate grade of Aplix ® fastening material to support bag 30 is rated at 15 pounds/square inch (1,056 grams/square cm.) shear strength with a piece two inches wide and the length of support flap 50 being used. As is known, the hook and loop fastening material has mating surfaces with the loops on one surface adapted to receive hooks from the other surface so as to achieve a grip. Since the loops and hooks must engage in sets, it is therefore desirable to always attach the same side (e.g. loops) to arm 20 so that if the bag 30 being attached thereto is a different one than usual, the gripping action will operate normally.

Due to the ability of the hook and loop attachment material to be repeatedly connected and disconnected, bag 30 may be either left in place on seat arm 20 or removed according to the needs of the hunter. If bags 30 are left in place on arms 20 and the hunter's seat 10 is taken down from the tree, bag 30 will not tend to slide out of place and the hunter can transport the assembly as one piece. Many stands S are provided with back straps to enable stand S to be carried on the back of the hunter, which can be accomplished while bags 30 are on arms 20 and held by the fastening material.

As illustrated in FIGS. 5, 6, 7, and 8, the components of twist clasps 40 are assembled to the upper edge of front panel 32 and to closure 38 on its front downward facing edge. The means of attachment employed for twist clasps 40 in the preferred embodiment is by a set of metal fingers which are forced through the fabric and bent over to clamp the clasp in position. A further depiction of clasp 40 is in FIG. 7 in a perspective exploded view. Twist clasp 40 is made of a pair of interlocking parts, twist clasp tongue 42 and twist clasp slot 44. As shown, tongue 42 is mounted to front panel 32 and slot 44 is mounted in a matching location on the front flap of closure 38. When closure 38 is brought into a closed position and slot 44 is placed in locking position around tongue 42, tongue 42 is twisted 90° in either direction to hold closure 38 in place. This particular form of clasp has been discovered to be preferable over snaps, zippers or hook and loop fasteners for this use since it affords the most noiseless secure means for closing bag 30. In addition to the advantage to the hunter of silence, clasps 40 are painted with a non-reflective black paint to minimize the chance of being seen by an animal due to light reflection. Three clasps are used to securely contain the contents of bag 30. Also, while not shown, some bag embodiments are divided into several compartments by the interposing of fabric dividers stitched to the inside of front and rear panels. The use of multiple clasps to close the bag top provides greater security of containment for each compartment and is particularly useful when a hunter's stand S is being transported with bag 30 attached.

A further modification of the invention which may be employed in certain embodiments without departing from the overall principles is the addition of a handle upon the top panel of closure 38. This handle 39 (FIGS. 2, 4, 5 and 8) would improve the ease of carrying bags 30 when carried independent of seat 10. Such a handle 39 would best be either removable or made of a relatively thin strap material so as not to interfere with the ability to wrap closure 38 over arm 20 and place arm cushion over the combination.

Thus, all objectives of the present invention are satisfied by the details disclosed herein. Hunter's bag 30 attaches easily to seat 10 and can be readily removed therefrom. Whereas the hook and loop fastener attachment will make a noticeable noise when being separated to remove bag 30, this is ordinarily at a time when the hunting activity is completed, and noise at that time is not objectionable. The fastener is virtually noiseless when being joined for mounting bag 30 to arm 20. Otherwise the invention has provided a bag which is essentially silent and not visually obvious. It is water resistant with closure edges overlapping the body for further protection. The bag provided is easily carried either with or without the seat.

While the preferred embodiment has described various details of the invention, other means of accomplishing the objectives may be apparent to those skilled in the art, and are to be considered within the scope and principles contained herein.

I claim:

1. A hunter's bag for containing items of use to a hunter while in a tree stand, comprising:
   (a) a bag formed of camouflage material and with a closer able to be flexed from an open position to a closed position;
   (b) means to attach said bag to a tree stand having hook or loop type fastening strip affixed to said bag and adapted to releasably attach to a mating fastening strip on said tree stand; and
   (c) first and second fastener means, said first fastener means being mounted on said bag and said second fastener means being mounted on said closure, said first and second fastener means being structurally formed such that selected surfaces of said first and second fastener means can be substantially silently engaged to close said bag.

2. A hunter's bag as in claim 1 in which said closure has a front edge and two end edges and has appended downwardly extending flaps on said front edge and two end edges.

3. A hunter's bag as in claim 1 in which said fastener means comprises at least one twist clasp tongue and slot device.

4. A hunter's bag as in claim 1 further comprising one or more dividers so as to divide said bag into a plurality of compartments.

5. A hunter's bag for containing items of use of a hunter while in a hunter's tree stand and configured to be attached to said tree stand, said bag comprising:
   (a) a pocket segment having:
      (i) front and rear substantially planar panels, each said panel having an upper edge; and
      (ii) a connecting panel stitched to all edges of each of said front and rear panels, except for said upper edges;
   (b) a closure having downwardly extending flaps on a front edge and two end edges thereof and flexibly attached to said upper edge of said rear panel and formed so as to be able to be flexed to provide access to the interior of the bag;
   (c) a support flap attached to said upper edge of said rear panel, positioned rearward of said closure, and having fastening means attached thereto, said fastening means being configured such that said bag may be releasably secured to a mating fastening means on a hunter's tree stand;
   (d) said front, rear and connecting panels and said closure and support flaps being made of camouflage pattern material; and
   (e) a plurality of twist clasp tongues fixedly attached to, and protruding outwardly from, the upper portion of said front panel and a mating plurality of twist clasp slots mounted in the front edge flap of said closure flap.

6. A hunter's bag as claimed in claim 5 further comprising a carrying handle of relatively thin strap material attached to said closure.

7. A method for keeping open a closure flap of a hunter's bag which bag is secured by means of a support flap to a substantially horizontal arm of a hunter's stand having a resilient split hollow cylindrical arm cushion typically mounted on said arm, said method comprising:
   (a) removing the resilient split hollow arm cylindrical arm cushion from said arm;
   (b) opening the closure flap of the bag;
   (c) wrapping said closure flap at least partially circumferentially around said arm so as to cover both said support flap and said arm;
   (d) spreading opposed edges of said split arm cushion so as to allow placement thereof around said arm, support flap and closure flap;
   (e) placing said spread arm cushion around said arm, support flap and closure flap; and
   (f) allowing said resilient spread arm cushion to resiliently contract so as to firmly grip around said arm, support flap and closure flap.

* * * * *

UNITED STATES PATENT AND TRADEMARK OFFICE
CERTIFICATE OF CORRECTION

PATENT NO. : 5,165,500
DATED     : November 24, 1992
INVENTOR(S) : Irma L. Bass

It is certified that error appears in the above-identified patent and that said Letters Patent is hereby corrected as shown below:

```
Column 5, line 45, "closer" should read --closure--.
                                           (PTO error)
```

Signed and Sealed this

Ninth Day of November, 1993

Attest:

BRUCE LEHMAN

*Attesting Officer*  *Commissioner of Patents and Trademarks*